United States Patent
Hino et al.

[15] 3,678,545
[45] July 25, 1972

[54] APPARATUS FOR STRETCHING A TUBULAR FILM OF THERMOPLASTIC SYNTHETIC POLYMERIC RESIN

[72] Inventors: Hiroyuki Hino; Hiroyoshi Asakuno, both of Ichiharashi; Tetsuya Yamada, Chibashi, all of Japan

[73] Assignee: Chisso Corporation, Osaka, Japan

[22] Filed: June 15, 1970

[21] Appl. No.: 46,047

[30] Foreign Application Priority Data

June 21, 1969 Japan.................................44/49076

[52] U.S. Cl. ..........................26/55, 264/210 R, 264/288, 264/DIG. 73, 425/66
[51] Int. Cl. ...........................B29d 7/24, D06c 5/00
[58] Field of Search............264/288, 289, 292, 95, DIG. 73; 26/55, 56; 425/66

[56] References Cited

UNITED STATES PATENTS

| | | | |
|---|---|---|---|
| 3,317,951 | 5/1967 | Hureau | 18/14 S X |
| 3,217,361 | 11/1965 | Ryan et al. | 264/95 UX |
| 3,304,352 | 2/1967 | Gerow | 264/290 X |
| 3,313,870 | 4/1967 | Yazawa | 264/290 X |
| 3,412,189 | 11/1968 | Sullivan | 264/95 |
| 3,161,942 | 12/1964 | Cheney | 264/95 X |

*Primary Examiner*—Philip E. Anderson
*Attorney*—Fred C. Philpitt

[57] ABSTRACT

A suspended internal mandrel apparatus for stretching a tubular film of a thermoplastic resin which comprises a mandrel, a member extending upwardly from said mandrel to which two spaced apart interior rolls are attached, and two exterior rolls disposed beneath said interior rolls and in abutting and supporting relationship therewith, said interior rolls, and exterior rolls and said member serving as the sole support means for said mandrel.

4 Claims, 3 Drawing Figures

PATENTED JUL 25 1972 3,678,545

APPARATUS FOR STRETCHING A TUBULAR FILM OF THERMOPLASTIC SYNTHETIC POLYMERIC RESIN

DESCRIPTION OF THE INVENTION

This invention relates to apparatus for stretching a tubular film of thermoplastic resin by means of a suspended internal mandrel.

It is well known that, when a thermoplastic resin film is biaxially stretched, its physical strength can be increased in both longitudinal and lateral directions, and further that when a thermoplastic resin film, particularly crystalline polypropylene film is uniaxially stretched in a longitudinal direction without causing a shrinkage in a lateral direction, a hard-to-tear, stretched film can be obtained.

Heretofore, it is well known in uniaxially or biaxially stretching methods to introduce a gas into a tubular film to inflate the tubular film, isolating the inside of the inflated film from the surrounding atmosphere at both ends of the film by means of dies or pinch rolls to form a bubble and stretch said portion while heating it.

However, the shape of the bubble is not stable in said method, and the position of stretching point is not constant. Thus, a stretched film having a non-uniform stretching or non-uniform thickness is liable to be produced. Thus, the practical application of said method is not satisfactory yet. As an improved method, it has been proposed to insert a mandrel into a tubular film. That is, it is proposed (1) to support a mandrel by a rod extended from the center of a die (Japanese Pat. Publication No. 18537/63) and (2) to cut a tubular film open and insert a mandrel therefrom (Japanese Pat. Publication No. 10584/62).

However, according to the method (1), cooling of the molten film, which is extruded from a die and serves as a prerequisite for the stretching, is carried out at a low temperature portion of the mandrel itself. Thus, the cooling takes place slowly and insufficiently. Meantime, cooling can be rapidly and sufficiently carried out, if cooled with water, but the die, water cooling apparatus and a mandrel must be arranged in this order in a perpendicular direction. Consequently, in order to completely remove water before the succeeding stage, that is, the stretching step, very expensive apparatus must be used. According to the method (2), a tension is applied to the cut-out portion of the film, and thus a notch is developed at the cut opening and propagate upwards, irrespective of the monoaxial stretching or biaxial stretching. As a result, the width of the film fluctuates, or in the worst case, a stretching breakage is brought about. These are the drawbacks of the prior art.

The present inventors have made studies to overcome such conventional methods and have found a method for inserting the suspended mandrel into a tubular film. Thus, the present inventors have accomplished the present invention on the basis of said new findings.

According to the present invention, at least two rolls are directly or indirectly fixed to a mandrel and inserted in a tubular thermoplastic resin. Said mandrel is supported in a suspended state by rolls, which form pairs of said respective rolls and are provided outside said tubular thermoplastic resin, to stretch said tubular film of thermoplastic resin on the mandrel.

The present invention will now be explained, referring to the accompanying drawings.

Figure 1:
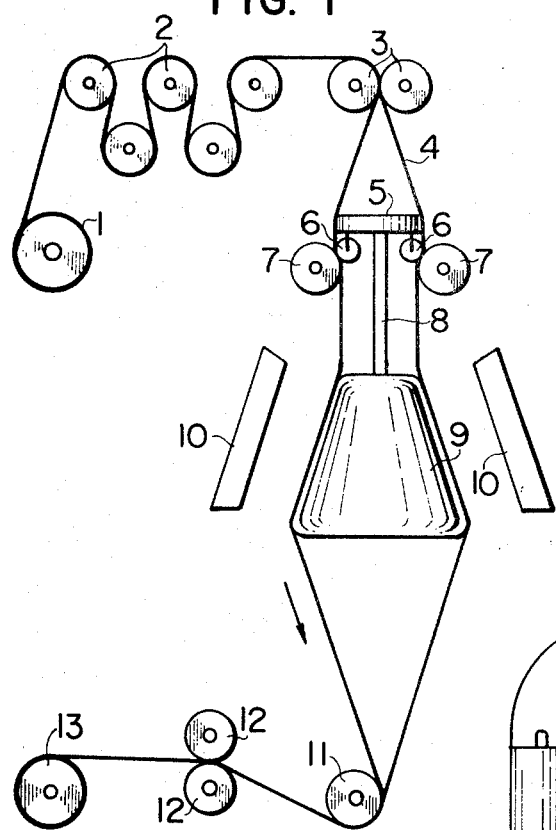
FIG. 1 is an elevational, schematic view of one embodiment of the present invention.
Figure 2:
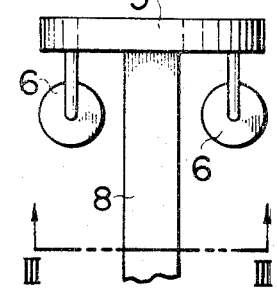
FIG. 2 is an enlarged elevational view of the internal rolls for supporting the mandrel.

In FIG. 1, numeral 1 is a raw material tubular film or sheet wound around a core cylinder and 2 are preheating rolls (other heat source such as infra-red rays or electric heating oven or the like can be used in place of the rolls). Numeral 3 are pinch rolls, 9 is a mandrel and 8 is a rod extending upwards from the top of the mandrel 9. Numeral 5 is an elliptical or track-form plate fixed to the tip of the rod 8, and internal rolls 6 are fixed to said plate 5. In that case, it should be understood that the rolls are indirectly fixed to the mandrel 9. Numeral 7 are outside rolls, which form pairs with said respective internal rolls 6. The rolls 7 are designed to pinch a film 4 together with the internal rolls 6. Numeral 10 is an infra-red oven, 11 is a free roll, 12 are pinch rolls and 13 is a winder.

The wound raw material sheet or film 1 can be replaced with a film that is extruded from a die and cooled.

The raw material tubular film is kept folded until the pinch rolls 3, then made open in an elliptical cross-sectional form or track form by the plate 5 and stretched over the mandrel when the film passes through the infra-red oven 10 while enclosing the mandrel 9. The stretched tubular film is again folded, passed over a free roll 11, pinched by the pinch rolls 12, and wound up around 13. The set of preheating rolls 2, pinch rolls 3, and rolls 7 are driven at an equal speed. The internal rolls 6 are pressed to the outside rolls 7 owing to the gravity of the mandrel and the stretching tension, and rotate at the same speed as that of the outside rolls 7, while pinching the film. The pinch rolls 12 are the driving rolls, and are more convenient, if they can have such a structure, which enables the setting of a speed ratio with the outside rolls 7 to a desired definite value. It is preferable that the cross-section of the stretching part of the mandrel 9 resemble a circular disc, and it is necessary that its surface have a rough finish of 50 to 400 meshes. If the surface is a nearly mirror surface-like one, the friction resistance becomes larger, and the film is sometimes melted and broken due to the heat of friction. To the contrary, if the surface is a rough finish of 50 meshes or under, scratches are liable to develop in a longitudinal direction on the film surface and the film is readily broken during the stretching. Even if the stretching can be carried out, scratches unfavorably remain on the surface.

Figure 3:
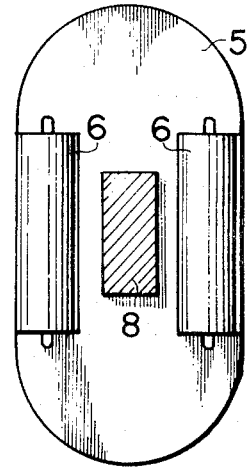
FIG. 3 is a plan view seen from III—III of FIG. 2.

The plate 5 of said track form is shown in FIG. 3.

As the tubular film or sheet is folded by the roll 11, a mandrel having a flat edge is preferable. Though numeral 10 is the infra-red oven, an electric heating or hot air-circulating type oven can be used. Furthermore, it is possible to use hot water as a heat source by providing the mandrel 9 and the free roll 11 in a hot water tank together.

The present invention is particularly suitable for preparing a hard-to-tear, uniaxially stretched article, and such uniaxially stretched articles can be used as weaving or knitting yarns for binding cords for general packaging, or bags for cereals or fertilizers in place of jute, etc.

What is claimed is:

1. A suspended internal mandrel apparatus for stretching a tubular film of a thermoplastic synthetic polymeric resin which comprises:
   a. a mandrel of circular cross section having a surface with a rough finish of 50 to 400 meshes,
   b. a member extending upwardly from said mandrel to which at least two spaced apart interior rolls are attached,
   c. at least two exterior rolls disposed at least partially beneath said interior rolls and in abutting and supporting relationship therewith,
   d. said interior rolls, said exterior rolls and member serving as the sole support means for said mandrel,
   e. a feed means located above said interior and exterior rolls which is adapted to feed a tubular film of thermoplastic resin downwardly between the abutting surfaces of said interior and exterior rolls,
   f. a take-up means located below said interior and exterior rolls which is adapted to pull said tubular film from between said interior and exterior rolls and over the mandrel that is suspended beneath said interior and exterior rolls, and
   g. means for applying heat to said mandrel.

2. An apparatus according to claim 1 wherein said feed means consists of feeding pinch rolls.

3. An apparatus according to claim 1 wherein said take-up means consists of taking-up inch rolls.

4. An apparatus according to claim 1 wherein the upper end of said member in (b) includes a generally elliptically-shaped plate, and said interior rolls are disposed on the underside thereof.

* * * * *